April 24, 1956 — C. M. RUTLEDGE — 2,743,115
COLLAPSIBLE GOLF CART
Filed Dec. 31, 1952 — 2 Sheets-Sheet 2
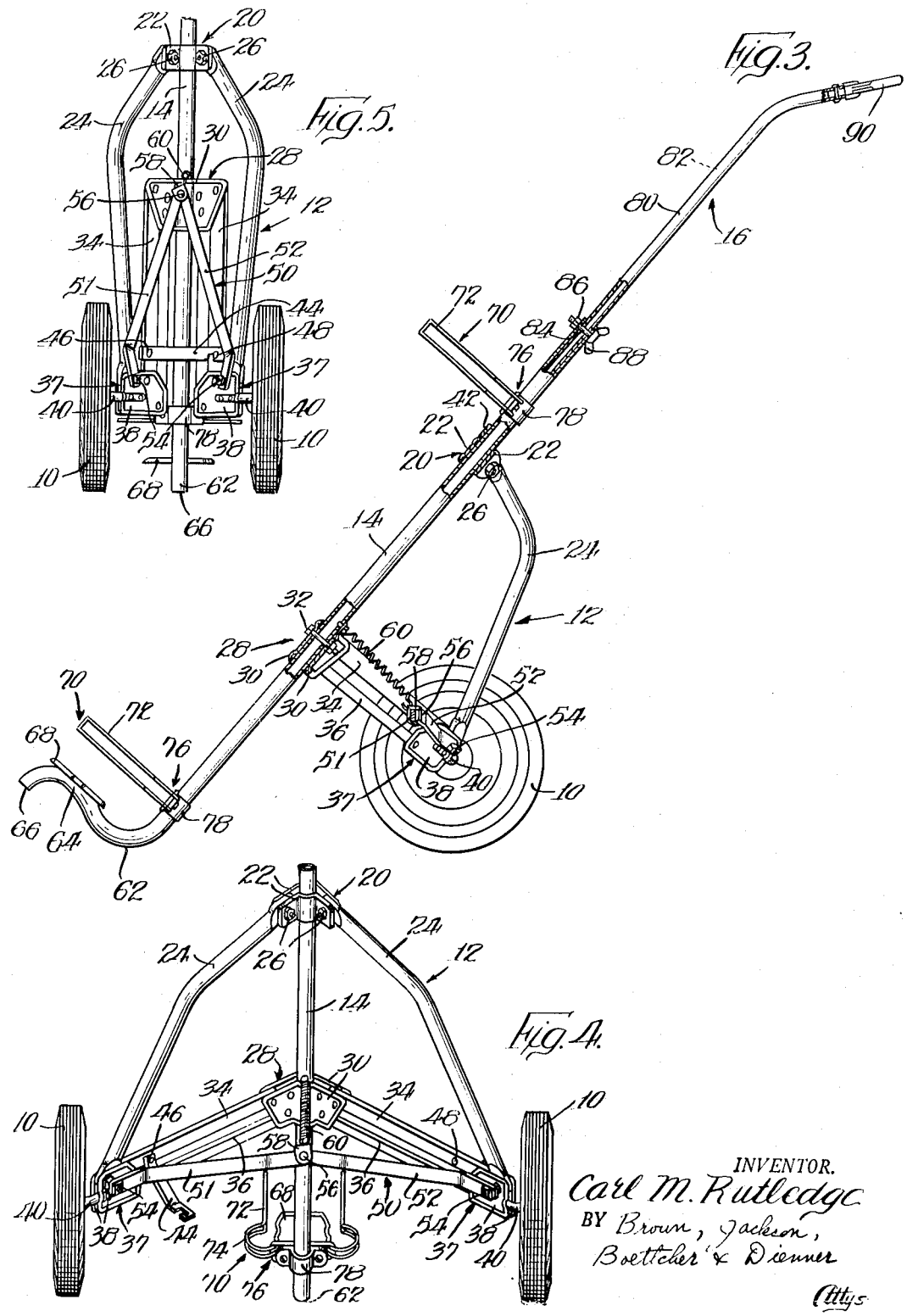
INVENTOR.
Carl M. Rutledge
BY Brown, Jackson, Boettcher & Dienner
Attys

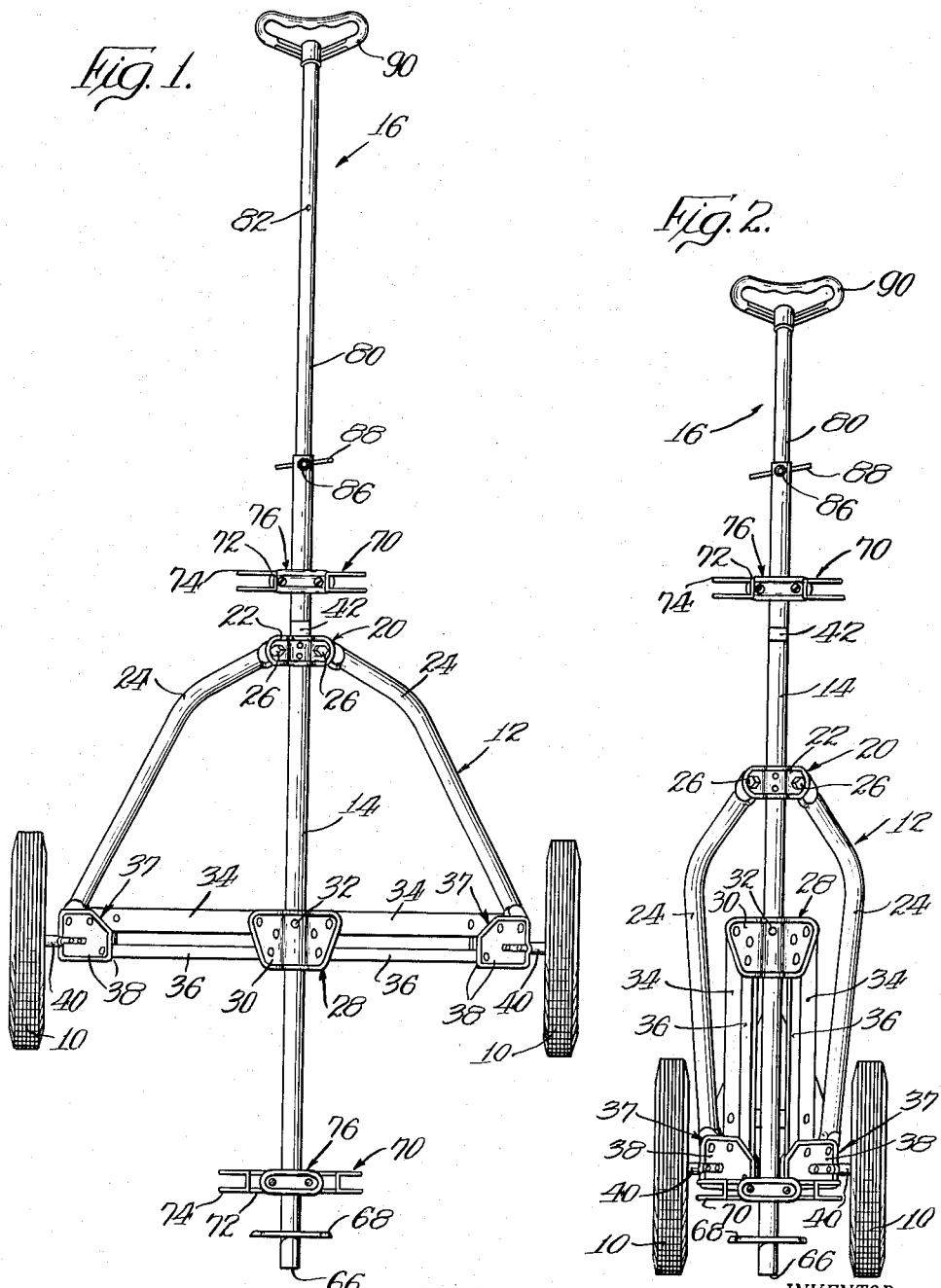

United States Patent Office 2,743,115
Patented Apr. 24, 1956

2,743,115

COLLAPSIBLE GOLF CART

Carl M. Rutledge, Chicago, Ill.

Application December 31, 1952, Serial No. 328,920

13 Claims. (Cl. 280—42)

The present invention relates to improvements in wheeled carts and, particularly, to an improved collapsible type two-wheel cart adapted to support a golf bag and be drawn by hand.

Golf carts of various constructions are presently on the market and in use. For example, a collapsible golf cart is disclosed in my copending application, Serial No. 207,001, filed January 20, 1951, and a golf cart of a partially collapsible nature is disclosed in my copending application, Serial No. 312,451, filed October 1, 1952, now Patent No. 2,687,895, dated August 31, 1954. The collapsible cart of my earlier application has the advantages over the cart of my later application in that the same is collapsible, is capable of being wheeled about in both its expanded and collapsed positions, and provides a three point support for supporting the cart substantially upright in both positions. The golf cart of my later application has the advantages over the cart of my earlier application in that the same provides center poise support for a golf bag and provides a greater degree of balance so that the cart is more easily and conveniently wheeled about. The two golf carts of my aforesaid applications not only exhibit the said advantages over one another, but also over prior developments in the art.

It is an object of the present invention to provide an improved golf cart providing in a single cart the advantages of my prior golf carts, particularly the advantages set forth above. Specifically, it is an object of the present invention to provide a two-wheel collapsible golf cart that is wheelable in both its collapsed and expanded positions, is capable of being rested substantially upright in both of its positions, provides a center poise support for a golf bag, and provides a very high degree of balance to impart optimum wheeling characteristics to the cart.

Another object of the invention is to provide an improved golf cart comprising a single post-like body member, and a collapsible assembly associated with the body member and supporting a pair of wheels, the collapsible assembly having a fixed support on the body member substantially centrally thereof, the wheels in the expanded position of the assembly being spaced from the body member and being generally aligned with the fixed support of the assembly to provide a support for the body member poised substantially centrally thereof and for supporting the body member at a substantial inclination to the vertical, the wheels in the collapsed position of the assembly being disposed immediately adjacent the body member with the ground engaging portions thereof generally aligned with the bottom of the body member for supporting the body member substantially vertically.

An additional object of the invention to provide an improved collapsible means or assembly for golf carts wherein the means or assembly is readily and conveniently actuated and wherein the weight of the golf bag supported by the cart assists in the actuation of the assembly.

A further object of the invention is the provision of improved bracing struts for bracing the collapsible assembly in its expanded position to prevent twisting or other distortion of the assembly.

A still further object of the invention is the provision of an improved collapsible golf cart including a telescopic handle member adapted to be employed in both the expanded and collapsed positions of the cart for wheeling the same.

Other objects and advantages of the present invention will become apparent in the following detailed description of a preferred embodiment of the invention wherein reference is made to the accompanying drawings, in which:

Figure 1 is an elevational view taken from the rearward or bag side of the cart, showing the cart in its expanded position and the post-like body member thereof disposed vertically;

Figure 2 is an elevational view similar to Figure 1, but showing the cart in its collapsed position, the post-like body member in Figure 2 being disposed at the same elevation and angle as in Figure 1, whereby Figures 1 and 2 provide a comparison between the expanded and collapsed positions of the cart;

Figure 3 is a side view, partly in section and partly in elevation, showing the cart in its expanded and normal wheelable disposition, the cart being shown in its expanded position of rest;

Figure 4 is a fragmentary elevational view taken from the forward side of the cart, the view showing the cart in its expanded position of rest; and Figure 5 is a fragmentary elevational view similar to Figure 4, but showing the cart in its collapsed position of rest.

Referring now to the drawings, I have shown a preferred embodiment of the golf cart of the present invention as comprising, generally, a pair of ground engaging wheels 10, a collapsible means, assembly, or linkage, 12 for supporting the wheels, a central main shaft or post-like body member 14 with which the collapsible means 12 is associated, and a handle 16.

The collapsible means or assembly 12 comprises an upper block 20, formed of a pair of brackets 22 engaging opposite sides of the body or shaft 14 and slidably mounted on the shaft 14, a pair of brace members 24, in the form of arms, each pivoted to one end of the block 20, as at 26, and extending to opposite sides of the body, a lower block 28, formed of a pair of brackets 30 engaging opposite sides of the body or shaft 14, fixed to substantially a central point on the body 14 by means of a fastener 32 or the like, pairs of parallel arms 34 and 36 each pivoted to one end of the lower block 28 and extending to opposite sides of the body 14, and a connecting member 37, in the form of a pair of gusset plates 38, to each side of the body 14 to which the free ends of the arms to each side of the body member are pivotally connected. As will be appreciated, the blocks 20 and 28 may be formed in any suitable manner, although it is preferred that the same each be formed of a pair of brackets as stated, with the lower block being suitably fixed with respect to the body member 14 and with the upper block 20 being slidable along the body 14. As is shown in Figure 3, the lower block 28 is preferably secured to the body or shaft 14 by means of the fastener 32, which preferably comprises a bolt extending through the block, that is through the brackets 30, and through the body 14. However, it will be appreciated that other means of securing the lower block to the body member may be employed, such, for example, as welding the lower block to the body. Likewise, other structures may be employed to form the connecting members 37, but the gusset plates 38, between which the arms are disposed, are a preferred structure for pivotally associating the outer or free ends of the arms 24, 34 and 36 of the collapsible linkage. As will be appreciated, the center post 14 and the assembly 12 comprise a jointed frame structure for the cart.

The ground engaging wheels 10 are each journaled on a stub shaft or axle 40, with the axles being secured between the respective gusset plates 38. In use, the arms 24, 34 and 36 maintain the axles 40 substantially horizontal and in axial alignment in all positions of the collapsible assembly or linkage so that the wheels 10 are maintained perpendicular to the ground and in ground engaging position in all positions of the assembly or linkage 12 and are journaled for rotation about a common axis. The blocks 20 and 28, as is best shown in Figures 3 and 4, are inclined forwardly of the body member to each side of the body member so that as the assembly is expanded or extended the wheels are moved forwardly of the body member and spread outwardly with respect to the body member.

As pointed out hereinbefore, the upper block 20 is slidably mounted on the center post or shaft 14 and the lower block 28 is fixed to the shaft 14. As shown in Figures 1 and 2, movement of the upper block upwardly along the shaft or body member 14 will move the brace members or arms 24 upwardly and will move the gusset plates 38 upwardly. Since the arms 34 and 36 have a fixed pivot with respect to the shaft 14, the outer ends thereof will be moved upwardly and outwardly to force the arms 24 and the gusset plates 38 outwardly to an expanded or extended position as is shown in Figure 1. As the upper block 20 is moved downwardly, the reverse action will occur, to move the assembly to its collapsed position as is shown in Figure 2. Due to the forward inclination of the ends of the blocks 20 and 28, the arms 24, 34 and 36 and the wheels 10 will be moved forwardly of the body member or shaft as the cart is extended. However, when collapsed, the arms and the wheels, that is the axis of rotation of the wheels, lie immediately adjacent the body member and are spaced slightly forwardly thereof so that the assembly, the wheels and the body present a compact appearance. Due further to the fixed mounting of the lower block 28 on the body member 14, as will be appreciated from a comparison of Figures 1 and 2, the wheels 10 have a substantial vertical movement with respect to the body member 14, the body member 14 in the two views being shown at the same elevation and in the same disposition, namely, vertically. In the expanded position of the cart, the parallel arms 34 and 36, together with the main shaft 14, define a generally triangular horizontal supporting frame structure, as will be apparent from Figure 4.

In construction, the parallel arms 34 and 36 are formed of a length to have a fixed pivotal mounting at substantially the mid-point of the body 14 and to dispose the wheels, in the collapsed position of the cart, so that the bottom or ground engaging portions of the wheels lie in a common horizontal plane with the lower end or bottom of the body or shaft 14. The brace members or arms 24 of the collapsible linkage or assembly are formed of a suitable length to extend above the lower block 28 in all positions of the assembly and to provide a smooth transmission of motion from the upper block to the parallel arms. In moving the linkage from collapsed to expanded or extended position, the arms 24, 34 and 36 are moved upwardly, outwardly and forwardly until the arms 34 and 36 extend substantially normal to the axis of the shaft 14. As is clearly shown in Figure 3, such disposition of the collapsible assembly poises the wheels 10 substantially centrally below the shaft 14 to provide a very high degree of balance and to provide optimum wheeling characteristics. In Figure 3, the cart is shown as rested on the ground. In such position, the lower end of the shaft 14 rests on the ground to provide, with the wheels 10, a three point support for the cart. The three points of support are spaced a substantial distance apart to define a large triangular supporting area providing a stable support even when the cart is rested on uneven or irregular terrain. In wheeling position, the lower end of the cart is raised and the body member and the golf bag thereon are supported in a generally horizontal upright position and are centrally poised over the two wheels for optimum balance in wheeling. The wheels are wide spread in the extended position so that the cart is not subject to tipping even when traversing very uneven terrain.

As will be appreciated from the foregoing, the collapsible assembly or linkage is in the nature of a double toggle linkage. Thus, to retain the cart in its expanded position, it is merely necessary to move the toggle linkage slightly over-center, that is, to move the parallel arms 34 and 36 to an extended position wherein the arms form an angle of less than 90 degrees with respect to that portion of the main shaft 14 lying between the blocks 20 and 28. To prevent collapsing of the cart by movement of the wheels in an upward direction, and to provide a stop for positioning the toggle linkage or collapsible assembly in over-center position, an abutment 42 is secured to or otherwise formed or mounted on the shaft or post-like body 14 for engagement by the slidable upper block 20. When collapsed, the assembly 12 will normally remain collapsed, but as a precautionary measure, it is preferred to provide a lock member or latch 44 for retaining the assembly in a collapsed position. As shown in Figures 4 and 5, the latch 44 is mounted at one end on a pivot 46 secured to the upper heavier arm 34 of one pair of the parallel arms and at its opposite end is provided with a slot adapted for the reception of a keeper 48 secured to the upper heavier arm 34 of the other pair of parallel arms. The latch, shown in its latched position in Figure 5, is particularly useful when the cart is being transported.

Means are provided to impart stability to the brace members 24 and to the parallel arms 34 and 36 so that there will be no tendency of the wheels 10 to swivel about the center post or body 14, or of the framework or collapsible linkage, to distort under heavier than usual loads while the cart is pushed or pulled over irregular terrain. To this end, a jointed strut 50 is formed from strut member 51 and 52 which are hingedly connected at their outer ends, as at 54, to the connecting members 37. Preferably, the outer ends of the strut members 51 and 52 are pivoted on the member pivotally connecting the brace member or arms 24 and the gusset plates 38. The connections 54 could, of course, be with either of the arms 34 or 36 and could be located anywhere along the arms 34 and 36. Preferably, however, the connections are with the connecting member 37 at the location shown. The inner ends of the foldable strut members 51 and 52 are joined together by a pivot 56, so constructed and arranged that the strut members 51 and 52 may pivot thereabout to the positions shown in Figures 4 and 5. A U-shaped member 58 carried by the pivot 56 prevents the strut members 51 and 52 from pivoting below the substantially horizontal position shown in Figure 4. A tension spring 60 is provided between the U-shaped member 58 and the lower block 28, first, to maintain a tension load on the jointed strut 50 to retain the collapsible assembly in its expanded position and to retain the block 20 in engagement with the stop or abutment 42 and to prevent undue strain on the jointed strut and the collapsible assembly and, second, to bias the jointed strut 50 toward collapsed position so that no interference is occasioned in collapsing the assembly 12.

As shown in Figure 3, the main shaft 14, at the lower end thereof, is curved laterally outwardly or rearwardly, as at 62, then upwardly, then across, as at 64, and then downwardly, terminating in a flat end portion 66. The curved portion 62 at the lower end of the shaft 14 provides a point of support for the shaft and the cart when the cart is in its extended position. The flat end portion 66 provides a point of support for the shaft and the cart when the cart is in its collapsed position. As shown in Figures 3 and 2, respectively, a three point support is provided in both positions of the cart. Also, when the cart is in its expanded position, the three point support thereof is of such nature that the shaft or post-like body member 14 is disposed at an angle of approximately 45° to the vertical. However, when the cart is in its collapsed position, the three point support is such that the shaft or post-like body member 14 is disposed vertically. In both positions, the cart is adapted to be wheeled about, as is readily apparent from Figures 2 and 3.

The main shaft or body member 14 of the cart is adapted to provide a support for a golf bag. To this end, the shaft 14 is provided with a bottom bag support 68 and a pair of bag gripping or supporting members or means 70. The bottom bag support 68 preferably comprises a metal plate or platform upon which the bottom of a golf bag is adapted to be rested. The gripping means 70 are substantially identical in form, and are mounted at spaced points on the shaft 14. The upper gripping means comprises a flexible, generally U-shaped frame 72, preferably formed of a double looped wire, characterized by bowed portions 74 (see Figure 4) between the bight and leg portions thereof, and a bracket 76 including a flanged U-shaped clamp 78 encircling the shaft 14 and having attachment to the frame 72 through a bracket plate or the like. At the central portion thereof, the clamp 78 is provided with a dimple or projection (not shown) adapted to be fitted within one of a plurality of bores (not shown) provided in the lower or forward side of the shaft 14, whereby the support or gripping means 70 may be adjusted longitudinally of the shaft 14 to accommodate bags of various lengths. The dimple or projection provided on the clamp 78 and fitting in one of the bores provided in the shaft 14 prevents accidental displacement of the gripping means, either axially or rotationally.

The lower bag supporting or gripping means 70 is identical to the upper bag supporting or gripping means and may be adjustably mounted on the shaft 14 in the same manner as the upper means 70 is mounted. However, there is no necessity for adjusting the lower supporting or gripping means 70, so it is preferable to have that means fixed in one position on the shaft 14. The predominant feature of the gripping means 70, in addition to the fact that the same accommodate bags of various widths due to the resiliency and bowed portions 74 thereof, is that the same retain the bag on the cart in an upright position, so that all compartments of the bag are exposed for ready access. By upright position is meant not only vertically upright, but horizontally upright. This is of particular importance for retaining golf bags provided with a plurality of individual compartments each adapted for the reception of one club, that is, a plurality of outer compartments for irons and four central compartments for woods.

In view of the foregoing, it will be appreciated that the term "right" as utilized herein is intended to apply to the disposition of the cart and/or of the golf bag in an accessible and proper position, particularly the vertical position shown in Figure 2 and the inclined position shown in Figure 3.

The handle 16 of the cart is preferably mounted for collapsible and extensible movement with respect to the body 14 of the cart. To this end, the center post or shaft 14 is formed of tubular stock and the handle 16 includes a tubular shaft 80 having an outer diameter slightly smaller than the inner diameter of the tubular shaft 14 so that the same may be telescopically associated with the shaft 14. To secure the handle 16 to the center post 14 in an adjusted position, the tubular shaft 80 of the handle is provided, as is shown in Figure 3, with a plurality of longitudinally spaced diametrical bores 82. The post 14 is provided adjacent its upper end with a diametrical bore through which, and through one of the bores 82 in the handle shaft 80, is adapted to extend a stud or bolt 84. In the structure shown, a nut 86 is secured, suitably by welding, to the upper surface of the tubular post 14 in alignment with the diametrical bore therethrough and the bolt 84 is provided with a wing head 88 to facilitate manual passage of the bolt 84 through the post 14 and the handle shaft 80 and threading of the same into the nut 86 to secure the handle in an adjusted position longitudinally of the post 14. For example, as is shown in Figures 1 and 3, the handle may be adjusted to an extended position with respect to the body 14 when the cart is in its expanded position and adapted to be wheeled over a golf course. As is shown in Figure 2, the handle is adapted to be telescopically inserted to substantially its full length within the body member 14 so as to reduce the overall length of the cart and to dispose the cart in a truly collapsed position, when the linkage or assembly 12 is collapsed. As an alternative to the construction shown, it will be appreciated that other adjustable locking or securing means, well known to the art, could be employed. At the outer end thereof, the handle is provided with a hand grip 90 comprising a generally elliptical ring adapted for the passage of the user's fingers. Also, to facilitate manipulation of the cart, in both of its positions, the handle shaft 80 is preferably curved adjacent the outer end thereof so that the hand grip 90 is disposed at an inclination with respect to the body 14 and the handle shaft 80.

In use, the cart normally will be grasped at the hand grip 90 and pulled behind the user so that the cart would travel to the right as the same is viewed in Figure 3. Accordingly, the side of the body 14 to which the collapsible linkage extends may be conveniently referred to as the lower or forward side and the other side may be referred to as the upper or rearward side, as has been done hereinbefore. In other words, the collapsible linkage extends from the forward or lower side of the shaft 14 and the bag supports 68 and 70 extend from the rearward side thereof. As shown in the drawings, it is preferable to dispose the wing head 88 of the bolt 84 to the forward or lower side of the shaft 14 for ready access even when a golf bag is mounted on the cart.

From the foregoing, it will be appreciated that the present invention provides an improved collapsible golf cart affording advantages heretofore unattained in a single structure. The cart provides all of the advantages inherent in a collapsible cart that is wheelable in both its extended and collapsed positions. At the same time, the cart provides a center poise balance both for itself and the golf bag carried thereby. Also, the bag gripping and supporting means retain the bag on the cart in upright position for maximum accessibility. As will be appreciated, it is desirable to make the cart as light weight as possible. To this end, the various components of the cart may suitably be formed of aluminum or a like light weight metal, and the main body 14, the handle shaft 80, and the brace members 24 are preferably formed of tubular stock.

In addition to the foregoing, it is to be noted that the advantage of wheelability in both expanded and collapsed positions renders the cart capable of more efficient use in that it is not necessary to carry the cart and bag even when traveling along narrow paths, or when bringing the cart into a club house or locker room. Also, the capability of the cart for being rested in an upright position when collapsed renders it unnecessary for clubhouse owners to erect special racks for retaining golf bags in their associated carts, as has been necessary with other developments in the art.

Furthermore, the cart of the present invention is so constructed that the weight of the golf bag carried thereby facilitates and assists in moving or actuating the collapsible assembly or linkage to expanded position. That is, as the collapsible linkage is first moved from collapsed position by unhooking the latch and spreading the wheels slightly, it is merely necessary to exert a downward force on the handle 16 to effect a complete expanding of the linkage. As will be apparent, the weight of the clubs and bag will supply a portion of the necessary force, thus decreasing the slight amount of manual exertion required. Despite this capability, however, the cart is readily and easily collapsed.

In view of the foregoing, it will be appreciated that the present invention provides substantial improvements in carts of the general character referred to. Other advantages and capabilities of the cart of the present invention will be apparent to those skilled in the art.

While I have described what I regard to be a preferred embodiment of my invention, it will be appreciated that various changes, rearrangements and modifications may be made therein without departing from the scope of the invention, as defined by the appended claims.

I claim:

1. In a two-wheel cart: a body member normally extending in a generally upright position; supporting means carried by said body member and adapted to support a golf bag or the like in a generally upright position to the rearward side of said body member; a pair of ground engaging wheels, one on each side of said body member; an axle for each of said wheels; collapsible means connecting said wheels with said body member and maintaining said wheels in substantially parallel relationship and substantially perpendicular to the ground whereby the loaded cart may be wheeled about in a generally upright position in both the collapsed and expanded positions of the cart; said collapsible means comprising a first pair of brace structures, in the form of a pair of parallel arms on each side of said body member; a second pair of brace structures, in the form of an arm on each side of said body member; each pair of parallel arms of the first mentioned pair of brace structures being pivotally connected by one set of ends with respect to the body member and being pivotally connected by their other set of ends with respect to the axle for a ground engaging wheel; each arm of the second mentioned pair of brace structures being pivotally connected with respect to the body member at one end in spaced relation to the pivotal connection of the first mentioned pair of brace structures with respect to said body member; each arm of the second mentioned pair of brace structures being pivotally connected with respect to said other set of ends of the first mentioned pair of brace structures by its other end; the pivotal connections of the arms of said first and second pairs of brace structures with respect to said upright body member being spaced apart longitudinally of said upright body member, whereby the pivotal connections are generally vertically spaced; and a block providing a slidable connection upwardly and downwardly with respect to said body member above the lower one of said pivotal connections; the said lower pivotal connection being spaced a substantial distance from the lower end of said body member; the arms of one of said pairs of brace structures being pivotally connected to said body member at said lower pivotal connection; the arms of the other of said pairs of brace structures having pivotal connection with respect to said body member by means of said block; said block being movable downwardly on said body member to move all of said arms and said wheels toward said body member to a collapsed position and being movable upwardly on said body member to move all of said arms and said wheels upwardly, outwardly and forwardly of said body member to an expanded position; the arms of said one pair of brace structures, which are pivotally connected with respect to said body member at the said lower pivotal connection, guiding said wheels for movement in an arc the lowest point of which is defined in the collapsed position of the cart.

2. A wheeled cart adapted to transport a golf bag or the like: said cart comprising a body member normally extending in a generally upright position; supporting means carried by said body member and adapted normally to support a golf bag or the like on said body member in a generally upright position to the rearward side of said body member; a pair of ground engaging wheels, one on each side of said body member; an axle for each of said wheels; a pair of arms on either side of said body member; each pair of arms being pivotally connected with respect to an axle by one set of ends and being pivotally connected by their opposite set of ends adjacent the midpoint of said body member; a brace member on each side of said body member; a block carried by and slidable along said body member above the point of pivotal connection of said arms with respect to said body member; each of said brace members being pivotally connected by one end with respect to an axle and by its other end being pivotally connected with said block; said arms when disposed substantially parallel to said body member being of a length to dispose the ground engaging portions of said wheels in a common plane with the lower end of said body member; said arms and said brace members guiding said wheels for movement in an arcuate path with respect to said body member; said block being movable downwardly on said body member to move said arms into substantially parallel relation with respect to said body member to a collapsed position wherein said wheels are disposed immediately adjacent said body member; said block being movable upwardly on said body member to move said arms and said wheels upwardly, outwardly and forwardly with respect to said body member to an expanded position wherein said pairs of arms extend substantially perpendicularly outward from said body member and said wheels are poised substantially centrally of said body member; said arms and said brace members maintaining said wheels in substantially parallel relationship and perpendicular to the ground; said wheels in all positions thereof being disposed for ground engagement whereby the cart is adapted to be wheeled in both the expanded and collapsed positions thereof.

3. A wheeled cart as set forth in claim 2, including stop means carried by said body member above said block, said stop means being disposed for engagement by said block when said block is moved upwardly to expand the cart; said stop means being disposed on said body member to be engaged by said block when said arms on either side of said body member are disposed to define an angle of less than 90 degrees with respect to the portion of said body member between the pivotal connection of said arms with respect to said body member and said block, said pair of wheels being adapted to be moved from their expanded position through a slightly further spread apart position prior to being moved to collapsed position adjacent said body member, whereby said arms and brace members are locked in expanded position when said block engages said stop means.

4. A wheeled cart as set forth in claim 2, wherein said body member is hollow and a handle is provided for wheeling the cart; said handle including an elongate shaft adapted to be telescopically received within said hollow body member and a hand grip at the outer end of said shaft; and means for adjustably locking said shaft in any one of a plurality of positions with respect to said body member, said means being adapted to lock said shaft in a position with respect to said body member wherein said hand grip is disposed immediately adjacent the upper end of said body member and at least one position wherein said hand grip is disposed at a substantial distance from the upper end of said body member.

5. A two wheeled cart comprising a jointed frame structure including a center post, a pair of brace members comprising arms disposed one on each side of said center post and having pivotal connection with respect to said center post, a pair of arms extending one on each side of said center post and having pivotal connection with respect to said center post, said arms being adapted to move into a position closely adjacent said center post when said cart is moved into collapsed position and to move into a position wherein said arms extend in a direction away from said center post in the extended position of said cart, connecting members disposed one on each side of said center post, an axle supported by each of said connecting members, a wheel journaled on each of said axles, each of said connecting members affording a pivotal connection for the outer ends of said arms, means providing a pivotal and slidable connection with respect to said center post for one set of said arms, means forming a strut in the extended position of the cart for connecting said arms for minimizing the tendency of said arms to twist about said center post when said cart is traversing irregular terrain, and a tension spring connected between said center post and said strut, said spring maintaining a tension load on said strut and tending to collapse said strut.

6. A two-wheeled cart comprising a jointed frame structure including a center post, a pair of brace members comprising arms disposed one on each side of said center post and having pivotal connection with respect to said center post, a pair of arms extending one on each side of said center post and having pivotal connection with respect to said center post, said arms being adapted to move into a position closely adjacent said center post when the cart is moved into collapsed position and to move into a position wherein said arms extend in a direction away from said center post in the extended position of the cart, connecting members disposed one on each side of said center post, an axle supported by each of said connecting members, a wheel journaled on each of said axles, each of said connecting members affording a pivotal connection for the outer ends of said arms, means providing a pivotal and slidable connection with respect to said center post for one set of said arms, said arms comprising a toggle linkage, said means being slidable along said center post to move said toggle linkage over-center in the extended position of the cart, a foldable strut pivotally connected at its opposite ends to said connecing members, said foldable strut including means accommodating folding thereof in one direction only, and a tension spring connected to said center post and said foldable strut, said spring normally exerting a tension load on said strut to retain said toggle linkage in over-center position in the extended position of said cart and normally tending to fold said strut in said one direction, said strut minimizing the tendency of said arms to twist about said center post when said cart is traversing irregular terrain.

7. A wheeled cart for transporting a golf bag or the like, comprising a main shaft, a pair of ground engaging wheels disposed to opposite sides of said main shaft in spaced parallel relation for rotation about a common axis, a connecting member supporting each of said wheels, first arm means on each side of said main shaft pivotally connected to said connecting members and pivotally connected with respect to said main shaft at substantially the midpoint of said main shaft, a block slidably mounted on said main shaft above the pivotal connection of said first arm means with respect to said main shaft, second arm means on each side of said main shaft pivotally connected to said connecting members and to said block, said block being movable downwardly on said shaft to move said arm means and said wheels downwardly and inwardly with respect to said main shaft to a collapsed position wherein said wheels lie immediately adjacent and generally parallel to said main shaft, said arm means being of a length to dispose said wheels in the collapsed position of said arm means with the lower surfaces thereof in a common plane with the lower end of said main shaft whereby the cart is wheelable in an upright position when the wheels are collapsed, said block being movable upwardly on said main shaft to move said arm means upwardly and outwardly with respect to said main shaft to position said wheels upwardly and laterally outwardly a substantial distance with respect to the lower end of said main shaft, said main shaft in said latter position of said arm means being poised substantially centrally above and between said wheels.

8. A wheeled cart for transporting a golf bag or the like, comprising a main shaft, a pair of ground engaging wheels disposed to opposite sides of said main shaft in spaced parallel relation for rotation about a common axis, a connecting member supporting each of said wheels, a pair of parallel arms to each side of said main shaft, each pair of said parallel arms being pivotally connected at their outer ends to a connecting member and being pivotally connected at their inner ends with respect to said main shaft adjacent the midpoint of said main shaft, a brace member disposed to each side of said main shaft, a block slidably mounted on said main shaft above the pivotal connection of said arms with respect to said main shaft, each of said brace members being pivotally connected at its outer end to a connecting member and being pivotally connected at its inner end to said block, said block being movable downwardly on said main shaft to move said brace members, said arms and said wheels downwardly into a collapsed position wherein said arms lie immediately adjacent said main shaft and substantially parallel thereto, said wheels in the collapsed position of the cart being disposed immediately adjacent said main shaft and having their axis of rotation disposed to one side of said main shaft, said arms being of a length to position said wheels in the collapsed position of the cart with their lower surfaces in a common plane with the lower end of said main shaft, said block being movable upwardly on said main shaft to move said brace members and said arms upwardly and outwardly with respect to said main shaft to an expanded position wherein said brace structures and said arms extend laterally outwardly from said main shaft, said block being movable upwardly on said main shaft to an extent slightly in excess of the movement required to dispose said arms perpendicular to said main shaft to attain maximum expansion of the cart, said arms, when said block is moved to the said extent, forming an angle of less than 90 degrees with respect to the portion of said main shaft between the pivotal connection of said arms with respect to said main shaft and said block, said arms being so pivotally mounted with respect to said body member and said brace members being so mounted with respect to said block as to move the axis of rotation of said wheels further to the said one side of said main shaft than the same is in when the cart is in collapsed position, said main shaft in the expanded position of the cart being poised substantially centrally above and between said wheels.

9. A wheeled cart as set forth in claim 8, including a foldable strut pivotally connected at its opposite ends to said connecting members, and a spring disposed between said main shaft and said foldable strut, said spring maintaining a tension load on said strut, said strut minimizing the tendency of said brace members and said arms to twist about said main shaft when the cart is traversing irregular terrain.

10. A wheeled cart as set forth in claim 8, including a latch pivotally mounted on one of said arms to one side of said main shaft, and a keeper mounted on the corresponding arm to the other side of said main shaft, said latch being of a length to engage said keeper when the cart is in collapsed position to retain the cart in collapsed position.

11. A wheeled cart for transporting a golf bag or the like, comprising a generally upright main shaft, a pair of ground engaging wheels disposed to opposite sides of said main shaft in spaced parallel relation for rotation about a substantially common axis, a first pair of brace structures, one on each side of said shaft, each pivotally connected at one end to said shaft adjacent the midpoint of said shaft and pivotally connected at the other end thereof with respect to a wheel, a block slidably mounted on said shaft above the pivotal connection of said first brace structures to said shaft, a second pair of brace structures, one on each side of said shaft, each pivotally connected at one end to said block and pivotally connected at the other end thereof with respect to a wheel, one of said pairs of brace structures comprising a set of parallel arms, one set on each side of said shaft, said brace structures maintaining said wheels in all positions thereof in parallel relation and perpendicular to the ground, whereby the cart is adapted to be wheeled about in any position of said brace structures, said block being slidable upwardly on said shaft to move the outer ends of said brace structures and said wheels outwardly and upwardly with respect to said shaft to an extended position wherein said brace structures extend outwardly from said shaft toward the respective wheels, and being slidable downwardly on said shaft to move the outer ends of said brace structures and said wheels downwardly toward said shaft to a collapsed position wherein said brace structures are disposed adjacent and generally parallel to said shaft, and a stop on said shaft above said block, said stop being disposed on said shaft to be engaged by said block when said block is moved upwardly on said shaft to define the extended position of the cart.

12. A wheeled cart for transporting a golf bag or the like, comprising a generally upright main shaft, a pair of ground engaging wheels disposed to opposite sides of said main shaft in spaced parallel relation for rotation about a substantially common axis, a first pair of brace structures, one on each side of said shaft, each pivotally connected at one end to said shaft adjacent the midpoint of said shaft and pivotally connected at the other end thereof with respect to a wheel, a block slidably mounted on said shaft above the pivotal connection of said first brace structure to said shaft, a second pair of brace structures, one on each side of said shaft, each pivotally connected at one end to said block and pivotally connected at the other end thereof with respect to a wheel, one of said pairs of brace structures comprising sets of parallel arms, one set on each side of said shaft, said brace structures maintaining said wheels in parallel relation and perpendicular to the ground, whereby the cart is adapted to be wheeled about in any position of said brace structures, said block being movable upwardly on said shaft to move the outer ends of said brace structures and said wheels outwardly and upwardly with respect to said shaft to an extended position and being slidable downwardly on said shaft to move the outer ends of said brace structures and said wheels downwardly toward said shaft to a collapsed position, a stop on said shaft above said block, said stop being disposed on said shaft to be engaged by said block when said block is moved upwardly on said shaft to define said extended position of said brace structures, and an upwardly foldable strut pivotally connected at its opposite ends with respect to said wheels and said brace structures, said strut in the extended position of said brace structures extending in a generally straight line and including means preventing downward folding of the strut beyond such position to minimize the tendency of said brace structures to twist or move when the cart is traversing irregular terrain.

13. A wheeled cart for transporting a golf bag or the like, comprising a generally upright main shaft, a pair of ground engaging wheels disposed to opposite sides of said main shaft in spaced parallel relation for rotation about a substantially common axis, a first pair of brace structures, one on each side of said shaft, and pivotally connected at one end to said shaft adjacent the midpoint of said shaft and pivotally connected at the other end thereof with respect to a wheel, a block slidably mounted on said shaft above the pivotal connection of said first brace structures to said shaft, a second pair of brace structures, one on each side of said shaft, each pivotally connected at one end to said block and pivotally connected at the other end thereof with respect to a wheel, one of said pairs of brace structures comprising sets of parallel arms, one set on each side of said shaft, said brace structures maintaining said wheels in parallel relation and perpendicular to the ground, whereby the cart is adapted to be wheeled about in any position of said brace structures, said block being slidable upwardly on said shaft to move the outer ends of said brace structures and said wheels outwardly and upwardly with respect to said shaft to an extended position and being slidable downwardly on said shaft to move the outer ends of said brace structures and said wheels downwardly toward said shaft to a collapsed position, a pair of strut structures, one to each side of said shaft, each pivotally connected at the outer end thereof with respect to the wheel and brace structures to that side of said shaft, said strut structures being pivotally connected together adjacent the inner ends thereof substantially in alignment with said shaft, said strut structures being folded in the collapsed position and extended in the extended position of said brace structures, said strut structures when extended minimizing the tendency of said arms to twist about said shaft when the cart is traversing irregular terrain, a latch pivotally mounted on one of said structures to one side of said shaft, and a keeper mounted on the corresponding structure to the other side of said shaft, said latch being of a length to engage said keeper in the collapsed position of said structures to retain the cart in collapsed position.

References Cited in the file of this patent
UNITED STATES PATENTS

| | | |
|---|---|---|
| 2,518,803 | Marvin | Aug. 15, 1950 |
| 2,608,418 | Finlayson et al. | Aug. 26, 1952 |
| 2,626,814 | Chamberlin | Jan. 27, 1953 |
| 2,626,815 | Chamberlin | Jan. 27, 1953 |